(12) United States Patent
Edwards

(10) Patent No.: US 10,974,243 B2
(45) Date of Patent: Apr. 13, 2021

(54) MICROFLUIDIC SENSORS USING ELECTROPHORESIS

(71) Applicant: QORVO US, INC., Greensboro, NC (US)

(72) Inventor: Thayne L. Edwards, Bend, OR (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/319,398

(22) PCT Filed: Jul. 26, 2017

(86) PCT No.: PCT/US2017/043959
§ 371 (c)(1),
(2) Date: Jan. 21, 2019

(87) PCT Pub. No.: WO2018/022758
PCT Pub. Date: Feb. 1, 2018

(65) Prior Publication Data
US 2019/0329255 A1  Oct. 31, 2019

Related U.S. Application Data

(60) Provisional application No. 62/368,261, filed on Jul. 29, 2016, provisional application No. 62/366,831, filed on Jul. 26, 2016.

(51) Int. Cl.
*G01N 27/447* (2006.01)
*B01L 3/00* (2006.01)
(Continued)

(52) U.S. Cl.
CPC ........ *B01L 3/502753* (2013.01); *B03C 5/005* (2013.01); *G01N 27/44752* (2013.01);
(Continued)

(58) Field of Classification Search
CPC ... G01N 29/022–036; G01N 27/44717; G01N 27/4473; G01N 30/62; G01N 30/76; B03C 5/005; B03C 5/022–028
See application file for complete search history.

(56) References Cited

U.S. PATENT DOCUMENTS 5,616,872 A   4/1997  O'Brien
6,294,063 B1 *  9/2001  Becker ................ B01F 13/0076
                                                204/450

(Continued)

FOREIGN PATENT DOCUMENTS

CN    1221309 C      10/2005
TW    201219292 A    5/2012
WO    2008/088289    7/2008

OTHER PUBLICATIONS

Durmus et al., "Acoustic-Based Biosensors," Encyclopedia of Microfluidics and Nanofluidics, Springer Scince+Business Media, New York, 2014, pp. 1-15 (Year: 2014).*

(Continued)

*Primary Examiner* — Alexander S Noguerola
(74) *Attorney, Agent, or Firm* — Mueting Raasch Group

(57) ABSTRACT

A sensor using electrophoresis may include a microfluidic channel and electrodes on opposite sides of the microfluidic channel to generate an electric field across, or normal to, the channel. The electric field may be used to drive charged particles of material, particularly material suspended in fluid in the microfluidic channel, toward or away from the one of the electrodes. The electric field may be modulated to allow material to continue flowing through the microfluidic channel, to remove non-target material, or to measure another target material.

11 Claims, 8 Drawing Sheets

(51) Int. Cl.
*G01N 29/02* (2006.01)
*G01N 29/036* (2006.01)
*G01N 29/22* (2006.01)
*B03C 5/00* (2006.01)

(52) U.S. Cl.
CPC ......... *G01N 29/022* (2013.01); *G01N 29/036* (2013.01); *G01N 29/222* (2013.01); *B01L 2300/0645* (2013.01); *B01L 2300/0887* (2013.01); *B01L 2300/161* (2013.01); *B01L 2400/0421* (2013.01); *G01N 27/44717* (2013.01); *G01N 2291/0255* (2013.01); *G01N 2291/0426* (2013.01)

(56) References Cited

U.S. PATENT DOCUMENTS

| | | | |
|---|---|---|---|
| 6,881,314 B1 * | 4/2005 | Wang | B01D 21/283 204/450 |
| 6,955,787 B1 | 10/2005 | Hanson | |
| 8,586,351 B2 | 11/2013 | Villa et al. | |
| 9,791,412 B2 | 10/2017 | Kukita et al. | |
| 9,821,310 B2 | 11/2017 | Guldiken et al. | |
| 2006/0172409 A1 | 8/2006 | Shinohara et al. | |
| 2010/0163410 A1 | 7/2010 | Mastromatteo et al. | |
| 2012/0118736 A1 * | 5/2012 | Fan | B03C 5/026 204/451 |
| 2014/0008307 A1 | 1/2014 | Guldiken et al. | |
| 2015/0276727 A1 | 10/2015 | Talebpour et al. | |
| 2016/0172775 A1 | 6/2016 | Tischer et al. | |

OTHER PUBLICATIONS

Caldwell et al., "Electrical Field-Flow Fractionation in Particle Separation. 1. Monodisperse Standards," Analytical Chemistry, vol. 65, No. 13, Jul. 1993, pp. 1764-1772.

Frey et al., "Continuous-Flow Multi-Analyte Biosensor Cartridge with Controllable Linear Response Range," Lab on a Chip, vol. 10, No. 17, Sep. 7, 2010, pp. 2226-2234.

Gale et al., "A Micromachined Electrical Field-Flow Fractionation (μ-EFFF) System," IEEE Transactions on Biomedical Engineering, vol. 45, No. Dec. 12, 1998, pp. 1459-1469.

International Search Report & Written Opinion from PCT Application No. PCT/US2017/043959, dated Nov. 27, 2017, 11 pages.

Extended European Search Report from EP Application 17835210.0 dated Feb. 31, 2020, 10 pages.

Scuor et al., "Modeling of a Microfluidic Channel in the Presence of an Eletrostatic Induced Cross-Flow", Biomedical Microdevices, vol. 7., No. 3, Sep. 15, 2005, pp. 231-242.

Yang et al., Opto-electrophoretic Detection of Bio-molecules Using Conducting Chalcogenide Glass Sensors, Optics Express, vol. 18, No. 25, Dec. 6, 2010, pp. 26754-26759.

Office Action from CN Application No. 2017800464192 dated Jan. 20, 2021, 11 pages.

* cited by examiner

MICROFLUIDIC SENSORS USING ELECTROPHORESIS

RELATED APPLICATIONS

This application is the § 371 U.S. National Stage of International Application No. PCT/US2017/043959, filed 26 Jul. 2017, which claims the benefit of U.S. Provisional Patent Application No. 62/366,831 filed on Jul. 26, 2016 and U.S. Provisional Patent Application No. 62/368,261 filed on Jul. 29, 2016, which applications are hereby incorporated herein by reference in their respective entireties to the extent that they do not conflict with the disclosure presented herein.

TECHNICAL FIELD

The present disclosure relates to acoustic resonator devices, including acoustic wave sensors and microfluidic devices that utilize electrophoresis and are suitable for biosensing or biochemical sensing applications.

BACKGROUND

Numerous instruments and measurement techniques exist for diagnostic testing of materials for medical, veterinary medical, environmental, biohazard, bioterrorism, agricultural, and food safety purposes. Diagnostic testing traditionally requires long response times to obtain meaningful data, involves expensive, remote, or cumbersome laboratory equipment, requires large sample size, utilizes multiple reagents, demands highly trained users, and can involve significant direct and indirect costs. For example, in both the human and veterinary diagnostic markets, most tests require that a sample be collected from a patient and then be sent to a laboratory, where the results are not available for several hours or days. As a result, the caregiver must wait to treat the patient.

Point of use (or point of care when discussing human or veterinary medicine) solutions for diagnostic testing and analysis, although capable of solving most of the noted drawbacks, remain somewhat limited. Even some of the point of use solutions that are available, are limited in sensitivity and reproducibility compared to in-laboratory testing. There are also often significant costs involved as separate systems may be needed for different point of use tests.

Bulk acoustic wave (BAW) sensors have been described for use as biosensors. Fluidic devices having BAW sensors for detecting the presence of an analyte in a sample often have biomolecules, such as antibodies or other proteins such as receptors, as well as polynucleic acids, poly-amino acids, or the like, attached to their surfaces. The analyte may bind to the biomolecule attached to the surface of the sensor and increase the mass bound to the sensor. The increased mass alters the wave propagation characteristics (e.g., magnitude, frequency, phase, etc.) of the sensor. The change in propagation characteristics due to analyte binding may be correlated with the amount of analyte bound to a surface and the bulk amount of analyte in the sample.

INTRODUCTION

Biosensor instruments employing BAW sensors may be useful to provide rapid analysis of samples in a small form factor, and thus may be suitable as point of use devices. Due to their potential for high sensitivity and small form factor, BAW sensor instruments may employ microfluidic channels in which a small volume of fluid sample flows through a fluidic channel across a surface of the BAW sensor for detection.

Because BAW sensors detect analytes at their surfaces and because BAW sensors employ microfluidic channels that tend to exhibit laminar flow, much of the analyte in a sample may not be detected with a BAW sensor because the analyte may not contact the surface of the BAW sensor. Thus, correlating the amount of analyte bound to a surface to a BAW sensor with an amount of analyte in a sample flowing through a microfluidic channel over the sensor may present challenges. In addition, the reproducibility of detection of analyte or determination of an amount of analyte in a sample when using a BAW sensor may suffer when the analyte concentration in the sample is low.

It would be desirable to provide a BAW biosensor platform for point of use testing having enhanced sensitivity and reproducibility. It would also be desirable to provide a BAW sensor that would decrease inherent issues associated with surface binding and laminar flow.

SUMMARY

In general, embodiments of the present disclosure relate to a sensor having a microfluidic channel that utilizes electrophoresis to improve the sensitivity of measuring target material, or analyte, in a sample fluid. The sensor includes electrodes disposed on opposite sides of the channel to concentrate the target material near the sensing resonator.

In one aspect, the present disclosure relates to an apparatus. The apparatus includes first and second electrodes configured to provide an electric field therebetween when operatively coupled to a power source. The apparatus also includes first and second dielectric layers disposed between the first and second electrodes. The dielectric layers are spaced from one another to at least partially define a microfluidic channel therebetween. The microfluidic channel extends along a length normal to the electric field. The apparatus further includes a bulk acoustic wave (BAW) resonator having a piezoelectric portion disposed between the first electrode and a driving electrode. The driving electrode is disposed outside of the channel. The first electrode and the driving electrode are operatively coupled to an oscillation circuit to power the resonator.

The first and second electrodes may be operatively coupled to a controller configured to apply a potential to the electrodes to generate the electric field.

The controller may be configured to provide a steady or pulsed electric field.

The controller may be configured to apply the potential to encourage any target material having a non-zero zeta potential present in a fluid in the microfluidic channel to move toward the resonator.

The controller may be configured to reverse the electric field to encourage any non-target material having a non-zero zeta potential present in a fluid in the microfluidic channel to move away from the resonator.

The controller may be configured to determine a concentration, a mass, or both.

The first dielectric layer may include a binding material to bind to a target material.

The dielectric layers and first and second electrodes may extend along the length of the microfluidic channel beyond a surface of the resonator.

The length of the microfluidic channel may extend between an upstream port and a downstream port of a microfluidic cartridge, and the dielectric layers and the first and second electrodes may be disposed at least between the resonator and the upstream port.

The upstream port of the microfluidic channel may be in fluid communication with a sample introduction port of a sensing platform.

A plurality of resonators may be disposed along the microfluidic channel.

In another aspect, the present disclosure relates to a method. The method includes applying a potential to first and second electrodes to generate an electric field normal to a length of a microfluidic channel disposed adjacent to a bulk acoustic wave (BAW) resonator. The method also includes flowing a fluid through the microfluidic channel over the resonator. The method further includes determining an amount of a target material in the fluid based on a characteristic of the resonator.

The method may include varying the potential to pulse the electric field.

The method may include reversing the potential to reverse the electric field before determining the amount of the target material.

The method may include flowing a washing fluid over the resonator before determining the amount of the target material.

The method may include the target material being a biomolecule having a non-zero zeta potential.

The method may include adjusting a pH of the fluid before, after, or before and after determining the amount of the target material.

The method may include the amount of the target material determined being at least one of a concentration, a mass, or both.

The method may include the fluid including a buffer solution or complex matrix.

The method may include the electric field being generated along about 50% to about 100% of the length of the microfluidic channel disposed in a microfluidic cartridge.

The disclosure may be more completely understood in consideration of the following detailed description of various embodiments of the disclosure in connection with the accompanying drawings.

Figure 1:
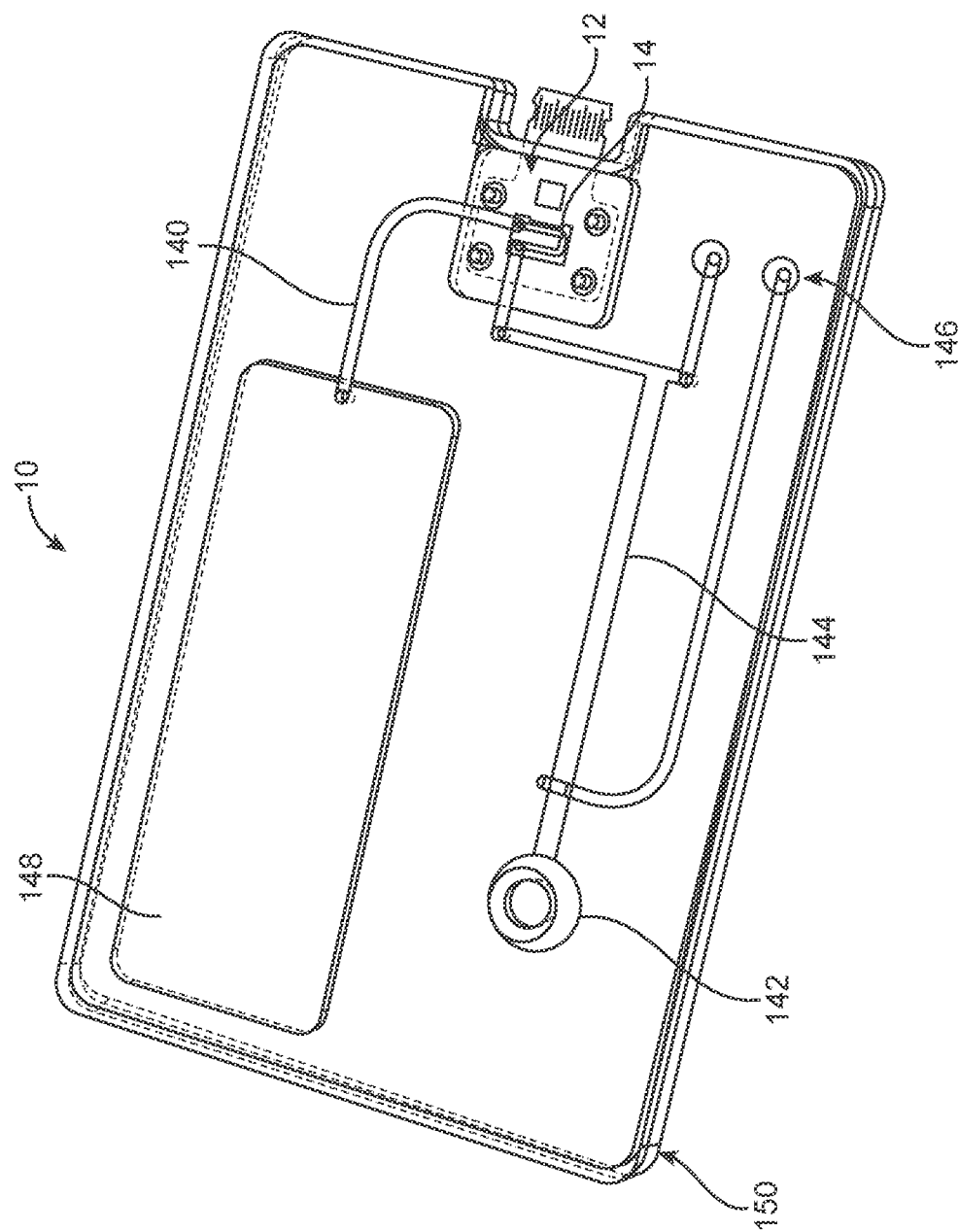
FIG. 1 is a perspective view of a sensor including a cartridge.

In the following detailed description, reference is made to several specific embodiments. It is to be understood that other embodiments are contemplated and may be made without departing from the scope or spirit of the present disclosure. The following detailed description, therefore, is not to be taken in a limiting sense.

DETAILED DESCRIPTION

This disclosure relates to a sensor with a microfluidic channel that uses phoresis, particularly electrophoresis for biosensing or biochemical sensing applications. Electrophoretic migration of electrically charged particles of a target material is used to enhance the concentration of the target at the sensor surface. Various other applications will become apparent to one of skill in the art having the benefit of the present disclosure.

It would be beneficial to provide a sensor to accurately and directly measure the change in frequency of one or more resonators over time, particularly in biosensing and biochemical sensing applications. In particular, it would be beneficial to improve the measurement and sensitivity of measuring the concentration of a target material in a fluid while maintaining the ability correlate concentration to the sensor response.

The present disclosure provides a sensor with a microfluidic channel and electrodes on opposite sides of the microfluidic channel to generate an electric field across, or normal to, the channel. The electric field may be used to drive charged particles of material, particularly material suspended in fluid in the microfluidic channel, toward or away from the one of the electrodes. The electric field may have the effect of concentrating target material near an acoustic resonator used to measure the concentration or mass of the target material with more sensitivity compared to the absence of the electric field. The electric field may be modulated to allow material to continue flowing through the microfluidic channel, to remove non-target material, or to measure another target material.

Complex particles (for example, biologicals such as protein or DNA) may combine bases that are either positively charged, negatively charged, or neutral. Some of the charges may even be buried on the interior of the complex particle and contribute only partially, or not at all, to the overall charge of the particle (in other words, shielded). The overall charge of the complex particle may depend on several factors—such as peptides exposed on the surface and pH of the suspending solution—and may result in a net charge referred to as a (zeta) potential (which may include shielding effects).

Electrophoresis refers to the movement of charged particles in a fluid or gel under the influence of an electric field. Electrophoretic mobility $\mu_e$ of a charged particle may depend on the size of the particle, zeta potential (or charge) of the particle, the ionic strength of the solution, and the electric field strength. If an electric field is applied normal to a resonator surface, the charged particle in the fluid in the microfluidic channel may migrate either toward or away from the resonator. For example, for a negative zeta potential, an electrode proximate to the resonator may be held positive relative to an electrode on proximate to the opposite side of the microfluidic channel to move a negatively charged particle (negative zeta potential) toward the resonator in the channel. Herein, the term "charge" may be used to refer to the zeta potential of a particle. The charge of a particle may have a magnitude and a polarity. The polarity may be positive, negative, or neutral (zero zeta potential).

A biosensor (or biological sensor) is an analytical device including a biological element and a transducer that converts a biological response into an electrical signal. Certain biosensors involve a selective biochemical reaction between a specific binding material (for example, an antibody, a receptor, a ligand, etc.) and a target species (for example, molecule, protein, DNA, virus, bacteria, etc.), and the product of this highly specific reaction is converted into a measurable quantity by a transducer. Other sensors may utilize a non-specific binding material capable of binding multiple types or classes of molecules or other moieties that are unlikely to be present in a sample may be useful in chemical sensing applications. The term "binding material," or functionalization material, may be used herein to generally relate to both specific and non-specific binding materials. Transduction methods may be based on various principles, such as electrochemical, optical, electrical, acoustic, and so on. Among these, acoustic transduction offers a number of potential advantages, such as being real time, label-free, and low cost, as well as exhibiting high sensitivity.

An acoustic wave device may employ an acoustic wave that propagates through or on the surface of a piezoelectric material, whereby any changes to the characteristics of the propagation path affect the velocity and/or amplitude of the wave. Presence of functionalization material embodied in a specific binding material along an active region of an acoustic wave device may allow a specific analyte to be bound to the specific binding material, which may alter the mass being vibrated by the acoustic wave and the wave propagation characteristics (for example, velocity, thereby altering resonance frequency). Changes in velocity may be monitored by measuring the frequency, magnitude, or phase characteristics of the sensor (for example, frequency shift), and may be correlated to a physical quantity being measured.

In the case of a piezoelectric crystal resonator, an acoustic wave may embody either a bulk acoustic wave (BAW) propagating through the interior of a piezoelectric material, or a surface acoustic wave (SAW) propagating on the surface of the piezoelectric material. SAW devices involve transduction of acoustic waves (commonly including two-dimensional Rayleigh waves) utilizing interdigital transducers along the surface of a piezoelectric material, with the waves being confined to a penetration depth of about one wavelength. In a BAW device, three wave modes may propagate, namely, one longitudinal mode (embodying longitudinal waves, also called compressional/extensional waves) and two shear modes (embodying shear waves, also called transverse waves), with longitudinal and shear modes respectively identifying vibrations where particle motion is parallel to or perpendicular to the direction of wave propagation. The longitudinal mode may be characterized by compression and elongation in the direction of the propagation, whereas the shear modes may consist of motion perpendicular to the direction of propagation with no local change of volume. Longitudinal and shear modes may propagate at different velocities. In practice, these modes may not be pure modes as the particle vibration, or polarization, may not be purely parallel or purely perpendicular to the propagation direction. The propagation characteristics of the respective modes may depend on the material properties and propagation direction respective to the crystal axis orientations. Since shear waves may exhibit a very low penetration depth into a liquid, a device with pure or predominant shear modes may operate in liquids without significant radiation losses (in contrast with longitudinal waves, which can be radiated in liquid and exhibit significant propagation losses). Shear mode vibrations may be beneficial for operation of acoustic wave devices with fluids (for example, liquids) because shear waves do not impart significant energy into fluids.

Certain piezoelectric thin films may be capable of exciting both longitudinal and shear mode resonance, such as hexagonal crystal structure piezoelectric materials including (but not limited to) aluminum nitride (AlN) and zinc oxide (ZnO). To excite a wave including a shear mode using a piezoelectric material arranged between electrodes, a polarization axis in a piezoelectric thin film may be non-perpendicular to (for example, tilted relative to) the film plane. Hexagonal crystal structure piezoelectric materials such as aluminum nitride (AlN) and zinc oxide (ZnO) tend to develop their polarization axis (i.e., c-axis) perpendicular to the film plane, but may be grown by known techniques (for example, reactive radio frequency magnetron sputtering) to yield crystals (for example, at least over a small area) with a c-axis having an orientation distribution that is predominantly non-parallel to normal of a face of the substrate. In biological sensing applications involving liquid media, the shear component of the resonator may be used. In such applications, piezoelectric material may be grown with a c-axis orientation distribution that is non-perpendicular relative to a face of an underlying substrate to enable a BAW resonator structure to exhibit a dominant shear response upon application of an alternating current signal across electrodes thereof.

BAW devices may be fabricated by micro-electro-mechanical systems (MEMS) fabrication techniques to provide microscale features suitable for facilitating high frequency operation. In the context of biosensors, functionalization materials (for example, specific binding materials; also known as bioactive probes or agents) may be deposited on sensor surfaces by various techniques, such as microarray spotting (also known as microarray printing). Functionalization materials providing non-specific binding utility (for example, permitting binding of multiple types or species of molecules) may also be used in certain contexts, such as chemical sensing.

Biochemical sensors may incorporate multiple resonators, such as at least one reference region devoid of specific binding material as well as one or more sensing regions (optionally arranged in one-dimensional or two-dimensional arrays) including one or more specific binding materials. Acoustic resonators may utilize electrodes composed of reactive metals (for example, aluminum or aluminum alloy) that are susceptible to corrosion when contacted with liquid. Unintended contact of fluid with bond pads of an acoustic resonator can result in damage to or reduced reliability of top side metal traces.

FIG. 1 shows a sensor 10 having a cartridge 12 housing a microfluidic channel 14. Cartridge 12 may be coupled to a sensor platform 150 to fluidly couple the channel 14 to a fluid flow path 140 housed in the sensor platform. The fluid flow path 140 may extend from a sample port 142 to a waste chamber 148. A sample fluid may be injected into the sample port 142 in fluid communication with a sample reservoir 144 along the fluid flow path 140. The sample fluid may contain a target material (analyte). The sample reservoir 144 may have a hydrophilic surface to draw the sample fluid into the reservoir. Sample handling fluid, such as buffer solution or complex matrix, may be injected into handling fluid ports 146 in fluid communication with the sample reservoir 144. The sample handling fluid may be used to push the sample fluid through the sample reservoir 144 toward the channel 14 of the cartridge 12. Sample fluid may flow through the channel 14 to the waste chamber 148. As sample fluid passes through or resides in the channel 14 of the cartridge 12, the presence of target material in the sample fluid may be measured. The cartridge 12 may be operatively coupled to an external detection platform (not shown) to further analyze measurement data. A complex matrix may include biological fluid, such as urine, blood, serum, plasma, or saliva.

Figure 2:
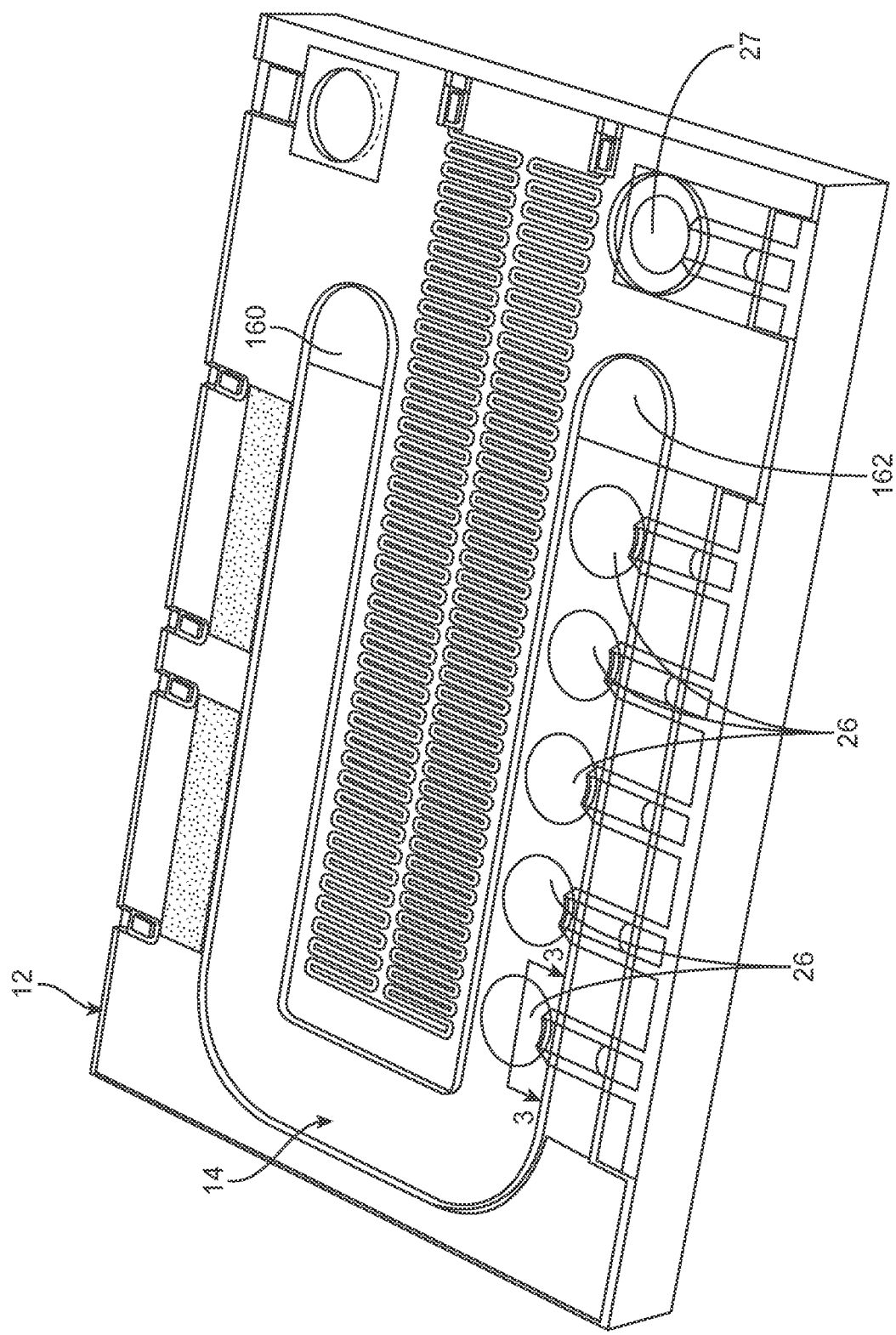
FIG. 2 is a perspective view of the cartridge of FIG. 1 including a microfluidic channel and at least one resonator.

FIG. 2 shows the cartridge 12 housing the microfluidic channel 14 and a plurality of resonators 26 disposed along the channel. The resonators 26 may be arranged in series, in parallel, or a combination of both along the channel 14. The resonators 26 may be exposed to the channel 14 to allow any fluid in the channel to flow over the resonators. One or more of the resonators 26 may be sensing resonators including specific binding material on a surface to bind target material. One or more of the resonators 26 may be reference resonators. A reference resonator may include non-specific binding material on a surface. The non-specific binding material may be similar to the specific binding material (for example, an antibody) but bind to a non-target material, which may be unlikely to be found in sample fluid. The non-specific binding material may be selected based on the particle size of the non-target material that binds to the non-specific binding material being similar to the particle size of the target material. A reference resonator may include non-functionalized binding material, such as silane, that may not bind to any material in the sample fluid.

The cartridge 12 may include a remote reference resonator 27. The remote reference resonator 27 may be acoustically coupled to a different type of fluid than the sample fluid. For example, the remote reference resonator 27 may be acoustically coupled to air.

Walls of the microfluidic channel 14 may be formed of any suitable material, such as laser-cut "stencil" layers of thin polymeric materials and/or laminate materials, optionally including one or more self-adhesive surfaces (for example, adhesive tape). Optionally such walls may be formed prior to deposition of a self-assembled monolayer (SAM), functionalization material, and/or blocking layers. The walls may be made with a SU-8 negative epoxy resist or other photoresist material. In certain embodiments, a cover or cap layer may be integrally formed with one or more walls (for example, via molding or another suitable process) to define a portion of an upper boundary as well as lateral boundaries of at least one fluidic channel, and the integrally formed partial cover-and-wall structure may be applied (for example, adhered or otherwise bonded) to enclose the at least one fluidic channel.

The channel 14 may extend a length from a proximal end portion (for example, upstream port 160) to a distal end portion 162 (for example, downstream port 162). In general, sample fluid may enter the channel 14 in the upstream port 160 and leave the channel in the downstream port 162. However, the fluid flow may be modulated, for example, stalled or even reversed in some cases. When the cartridge 12 is coupled to the sensing platform 150 (FIG. 1), the upstream port 160 may be in fluid communication with the sample port 142 (FIG. 1) and the downstream port 162 may be in fluid communication with the waste chamber 148 (FIG. 1). The channel 14 may extend parallel to a plane or be described as planar. The channel 14 may have a U-shape.

The cartridge 12 may include one or more electrodes. In some embodiments, at least one electrode is positioned above the channel 14 and at least one electrode is positioned below the channel 14. The electrodes may cover the at least some, or the entire, width of the channel 14. The electrodes may extend along at least a portion of the length of the channel 14. The electrodes may be disposed at least between one or more of the resonators 26 and the upstream port 160 along the length of the channel. The electrodes may extend over a surface of one or more resonators 26. The electrodes may extend beyond a surface of one or more of the resonators 26. In some embodiments, one or more electrodes extend over the entire length of the channel 14.

In some embodiments, the electrodes may provide an electric field along the length of the channel 14. The electric field may be generated, or applied, along at least about 25%, about 33%, about 50%, about 66%, about 75%, about 90%, about 95%, or about 100% of the length of the channel 14. The electric field may be applied along at most about 95%, about 90%, about 75%, about 66%, about 50%, about 33%, or about 25% of the length of the channel 14. Preferably, the electric field is applied along about 50% to about 100% of the length of the channel 14.

The electric field may be applied to the entire channel 14. The electric field may be applied to only a portion of the channel 14. The electric field may be applied to all the resonators 26. The electric field may be applied to only some of the resonators 26. The electric field may not be applied to portions of the channel 14 that coincide with one or more driving electrodes.

Preferably, the electric field is applied to at least a portion of the channel 14 immediately upstream of one or more resonators 26 to allow movement of the target material toward the resonator surface prior to flowing over the resonator surface.

Figure 3:
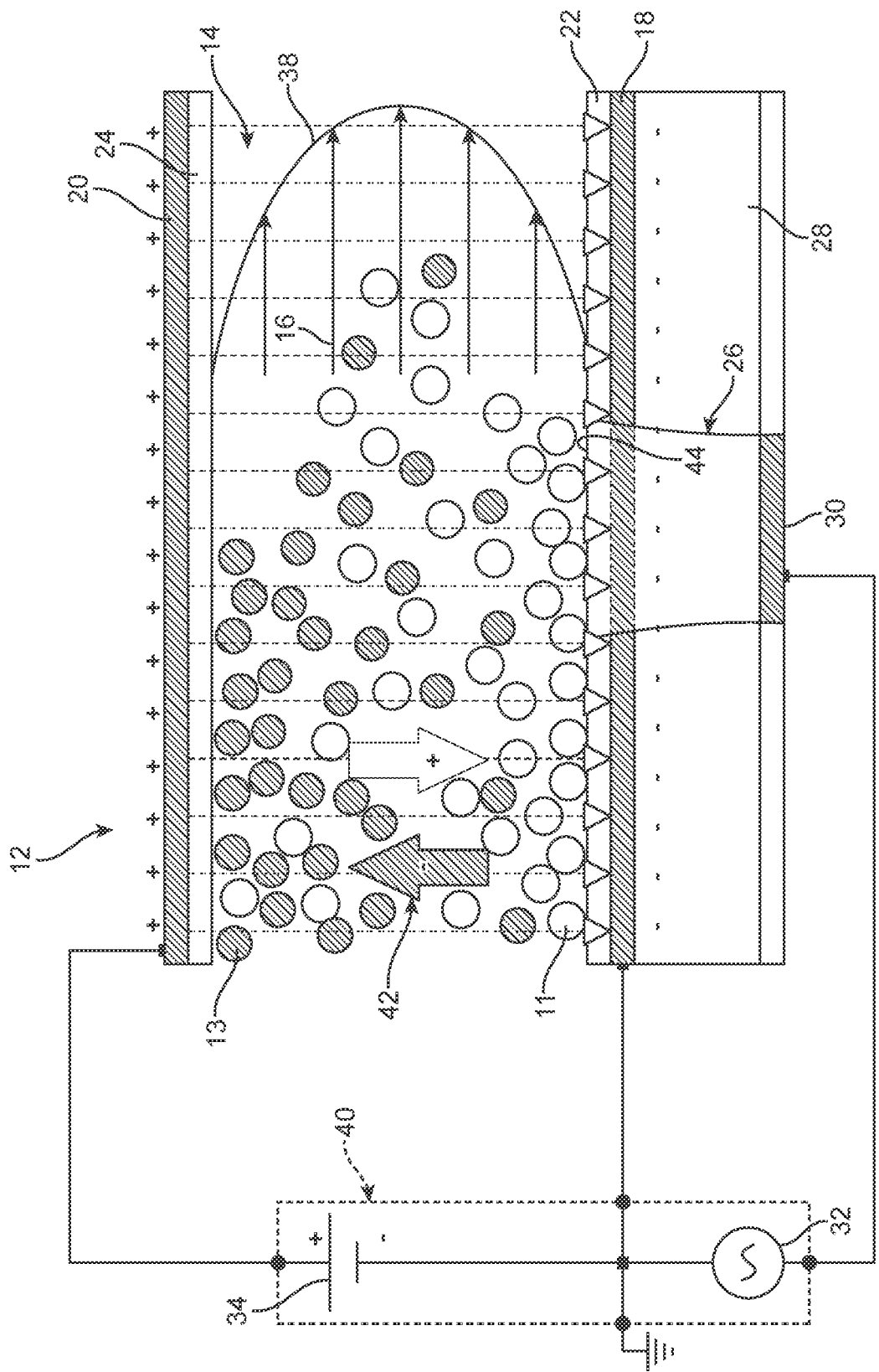
FIG. 3 is a cross-section diagram of the cartridge along line 3-3 of FIG. 2 showing the microfluidic channel.

FIG. 3 shows a cross-section of a portion of the cartridge 12 at line 3-3 in FIG. 2. As illustrated, a portion of the microfluidic channel 14 has a direction of fluid flow 16 going from the left side of the page to the right side of the page. The cartridge 12 may include one or more of a first electrode 18, a second electrode 20, a first dielectric layer 22, a second dielectric layer 24, a resonator 26 including at least a portion of a piezoelectric layer 28, a driving electrode 30, and a controller 40 including an oscillation circuit 32 and a power source 34, such as a voltage source. An electric field 42 may be provided by the electrodes 18, 20. The resonator 26 may include a surface 44 exposed to the channel 14. The driving electrode 30 may be adjacent, or proximate, to the first electrode 18. The driving electrode 30 may be formed in the same layer as the first electrode 18. The electric field 42 may not be provided by the driving electrode 30.

The first and second dielectric layers 22, 24 may be spaced from one another to at least partially define the channel 14 therebetween. Each of the dielectric layers 22, 24 may be disposed adjacent, or proximate to, to one of the first and second electrodes 18, 20, respectively. The dielectric layers 22, 24 may be disposed between the first and second electrodes 18, 20. The surfaces of the dielectric layers 22, 24 may be aligned in parallel to the direction of fluid flow 16 and may be aligned in parallel to one another. The length of the channel 14 may extend parallel to the surfaces of the dielectric layers 22, 24.

The dielectric layers 22, 24 may protect a respective electrode 18, 20 from corrosion, particularly from electrochemical etching, due to the presence of ionic fluid in the channel 14 and the effects of the electric field 42. In some embodiments, the dielectric layers 22, 24 are as thin as possible, which may minimize degradation of the electric field 42 due to the presence of the dielectric layers.

The dielectric layers 22, 24 may be formed of any suitable dielectric material. In some embodiments, one or more of the dielectric layers 22, 24 is formed of silicon dioxide. In some embodiments, a binding material may be attached to a dielectric layer 22, 24 formed of silicon dioxide. For example, the binding material may be modified to include (or may include) a silane group that can bind to silicon dioxide via hydrolysis. Of course, any other suitable chemistry may be employed to covalently attach the binding material to a surface of a dielectric layer.

The surfaces of the electrodes 18, 20 may be aligned in parallel to the direction of fluid flow 16 and may be aligned in parallel to one another. The electric field 42 generated may provide a force upon charged particles that is oriented normal to a length of the channel 14, normal to the direction of fluid flow 16, or both.

The channel 14 may receive a fluid, which may contain target material and non-target material. The target material, the non-target material, or both may be suspended in the fluid in the form of particles. The target material, the non-target material, or both may be biomolecules, such as proteins or DNA, or other complex particles. The particles of material may have a positive zeta potential (a positive charge), a negative zeta potential (a negative charge), or zero zeta potential (a neutral charge). Preferably, in some embodiments, the target material is a biomolecule and has a non-zero zeta potential.

The fluid may be a liquid, such as a buffer solution, that may have a pH value. The pH value may be adjusted to alter the zeta potential of the target material, non-target material, or both. The pH value may be adjusted before, during, or after the fluid is exposed to the channel 14. The particle's magnitude, polarity, or both may be altered by the pH value adjustment. Preferably, the pH is adjusted so that the target material has a non-zero zeta potential. Because the sensors may employ a selective binding material such as an antibody, the target material is known. Accordingly, the pH of the buffers employed may be controlled to ensure that the target material has a non-zero zeta potential and, thus, will be affected by the electric field 42.

In some embodiments, the buffer solution may include a salt compound, which may degrade the electric field 42 due to ionization of the salt compound particles. Some common biological buffered solutions, such as phosphate-buffered saline (PBS), tris(hydroxymethyl)aminomethane (Tris), 4-(2-hydroxyethyl)-1-piperazineethanesulfonic acid (HEPES), or other similar solutions, may include a salt compound, and may be employed as fluids to carry a sample in channels of devices described herein. Preferably, the fluids employed to carry samples have a low ionic strength to mitigate degradation of the electric field 42.

The resonator 26 may be a bulk acoustic wave (BAW) resonator. The resonator 26 may include a portion of the piezoelectric layer 28 to generate physical movement in response to electrical energy. The resonator 26 may be disposed adjacent, or proximate, to the channel 14. The resonator 26 may include the surface 44. The surface 44 may be part of a surface of the first dielectric layer 22 exposed to the channel 14. The surface 44 may include binding material to bind target material to the surface 44.

The binding material on the surface 44 may bind to a target material suspended in the channel 14 that comes into contact, or within a capture proximity, of the binding material.

The portion of the resonator 26 in the piezoelectric layer 28 may be disposed at least partially between the first electrode 18 and the driving electrode 30. The resonator 26 may be considered to include at least a portion of the first electrode 18 and at least a portion of the driving electrode 30. The controller 40 may be operatively coupled to the first electrode 18 and the driving electrode 30 to power, or drive, the resonator 26. In particular, the first electrode 18 and the driving electrode 30 may be operatively coupled to an oscillation circuit 32 of the controller 40 to power the resonator 26.

The controller 40 may be operatively coupled to the first and second electrodes 18, 20. The power source 34 of the controller 40 may apply a potential to the electrodes 18, 20 to provide the electric field 42.

The electric field 42 may be static or dynamic. In some embodiments, the electric field 42 may be constant as fluid is flowed through the channel 14. In some embodiments, the electric field 42 may switch between at least a first configuration and a second configuration over time.

The different configurations may be useful to manipulate charged particles in the channel to provide more sensitive measurements. The electric field 42 may be used to encourage any target material present in the fluid in the channel 14 to move toward the resonator 26. The electric field 42 may also be reversed to encourage any non-target material present in the channel 14, which may have the same charge as the target material, to move away from the resonator 26. For example, over a first period of time, a negative charge on the first electrode 18 and a positive charge on the second electrode 20 may be used to provide a first configuration of the electric field 42. Over a second period of time, the electric field 42 may be reversed using a positive charge on the first electrode 18 and a negative charge on the second electrode 20 to provide a second configuration. In the first configuration, positively charged particles 11 in the channel 14 may be encouraged toward the bottom of the channel toward the negative charged first electrode 18. In the second configuration, negatively charged particles 13 in the channel 14 may be encouraged toward the bottom of the channel toward the positively charged first electrode 18.

Under typical operating conditions, flows in the channel 14 may be laminar. The velocity of charged target material particles in the channel 14 under the influence of the electric field 42 may be slowed due to the characteristics of laminar flow 38. The characteristics of laminar flow 38 may dictate that the velocity of fluid flowed through the channel 14 is lower near edge regions of the channel (for example, near the top and bottom edges) compared to the velocity of fluid near central regions of the channel. Thus, uncharged particles or charged particles with lower zeta potentials may flow closer to the center of the channel 14, and faster, compared to charged particles with higher zeta potentials that flow closer to an edge when the channel is subjected to an electric field 42.

Similarly, more charged particles 11, 13 may be expected to flow closer to the center when no electric field is applied. Thus, in the absence of the electric field 42 described herein, much of the target material in the sample fluid would be expected to not interact with the surface 44 of the resonator 26. As such, determining the concentration of target material in the sample fluid can be difficult. Such determinations may be confounded by sample fluids having particularly low concentrations of target material particles. Thus, by causing charged target material particles to move towards the surface 44 of the resonator 26 under the influence of the electric field 42 as described herein, some of the difficulties associated with laminar flow and surface binding may be alleviated.

In some embodiments, the electric field 42 may be pulsed or alternated between the first and second configurations. The controller 40 may vary the potential applied to the electrodes 18, 20 to pulse the electric field 42. In the presence of a strong electric field 42, particularly one that extends about 50% to about 100% of the length of the channel 14, the target material particles may be strongly concentrated at an edge (for example, the bottom edge) of the channel. The velocity of charged particles near the edges may even approach zero. Some of the target material particles may not flow through the channel 14 and reach the resonator 26 in a suitable timeframe. To allow more charged particles to move away from zero or low velocity edges of the channel 14 and flow downstream, the electric field 42 may be pulsed to a lower magnitude field or to an opposite polarity field. Pulsing may allow charged particles to diffuse toward a higher velocity region of the channel 14 in the absence of an electric field 42 or encourage the particles away from the edge of the channel in the presence of a reversed electric field. More charged particles, preferably target material particles, may reach the resonator 26 for binding and measurement.

The pulse may be in the form of any suitable pattern whether periodic or non-periodic. The pulse of the electric field 42 may be described by the potential applied to the electrodes 18, 20. In some embodiments, the potential applied to the electrodes 18, 20 may be in the form of a square wave. In one example, the electric field 42 may be alternated between a first configuration and a null configuration (for example, no field), which may be produced by applying a potential to the electrodes 18, 20 that alternates between an "on" state (positive or negative potential) and an "off" state (zero potential or lower magnitude potential). In another example, the electric field 42 may be alternated between a first configuration and a second configuration, which may be produced by applying a potential to the electrodes 18, 20 that alternates between a "nominal" state (positive or negative potential) and a "reverse" state (a potential with the opposite polarity). In some embodiments, the magnitude (absolute magnitude) of the potential in the "reverse" state may be less than the magnitude of the potential in the "nominal" state.

As shown in the illustrated embodiment, the concentration of charged particles 11, 13 may be described as a gradient under the influence of the electric field 42. For example, in the first configuration, the concentration of positively charged particles 11 in the channel 14 may be influenced by the electric field 42 to a greater concentration proximate to the negatively charged first electrode 18 (bottom of the channel) compared to the concentration proximate to the positively charged second electrode 20 (top of the channel).

Further, in the direction of the fluid flow 16, the concentration may be greater downstream compared to the concentration upstream. For example, in the first configuration, positively charged particles 11 may be more concentrated proximate to the positively charged first electrode 18 on the right side of the page (farther downstream in the channel 14).

The relationship between the concentration of the sample on the surface 44 of the resonator 26, in particular a sensing resonator, in the channel 14 and the bulk concentration prior to electrophoresis may be described according to:

$$C(y) = C_0 e^{-\frac{y}{\lambda w}} \quad \text{EQ. 1}$$

$$C_0 = \frac{C_{bulk}}{\lambda(1 - e^{-1/\lambda})} \quad \text{EQ. 2}$$

$$\lambda w = \frac{D}{U} \quad \text{EQ. 3}$$

where D is the diffusion coefficient of species in solution, U is the electrophoretic flux of species, proportional to the zeta potential and size, w is the height of the channel 14 (for example, between the dielectric layers 22, 24), y is a position in the channel 14 less than or equal to W (for example, y is along an axis that extends from the first electrode 18 to the second electrode 20 and may be orthogonal to the direction of fluid flow 16 or to the length of the channel 14), lambda ($\lambda$) is the fractional width of the channel occupied by the species under influence, C(y) is the concentration of species as a function of height position y in channel at equilibrium (for example, in units of pg/ml or mmol/ml), $C_0$ is the concentration of species at the surface 44 of the resonator 26 after equilibrium is reached, and $C_{bulk}$ is the bulk concentration of species before the applied electric field (for example, the bulk concentration may be isotropic and uniform in all spatial dimensions in the channel 14). The Equations 1, 2, 3 may be used to solve for $C_{bulk}$, which may indicate the concentration of target material in the fluid in the channel.

In the absence of fluid flow 16, the charged particles 11, 13 may be more evenly distributed throughout the length of the channel 14 at equilibrium. In other words, after sufficient time, even when the electric field 42 is applied to the channel 14, the concentration of the charged particles 11, 13 may be the same at a downstream location and at an upstream location in the channel 14 without the effects of laminar flow 38.

In some embodiments, the electric field 42 may be reversed before determining the amount of target material to encourage non-target material particles, that may share the same positive or negative charge with the target material particles, away from a surface of the resonator 26. In some embodiments, a washing fluid may be flowed over the resonator 26, for example to wash away the non-target material particles after reversing the electric field 42 and before determining the amount of target material.

The controller 40 may be operatively coupled to one or more resonators 26. The resonators 26 may be operatively coupled to the controller 40 in parallel (for example, all at once), in series (for example one at a time), or a combination of both (for example, only some at a time).

The controller 40 may determine an amount of target material, such as a concentration, a mass, or both, based a characteristic of the resonator. The determination may be made by at least part of the controller 40, which may be on or off the cartridge 12 (for example, externally determined). The characteristic may be a frequency, a phase, or a related parameter. The characteristic may correspond at least one of a concentration, a mass, or both of the target material. A person of ordinary skill in the art having the benefit of this disclosure may select any suitable known technique for determining the amount of target material based on one or more resonator characteristics.

One or more of the controllers, such as controller 40, described herein may include a processor, such as a central processing unit (CPU), computer, logic array, or other device capable of directing data coming into or out of the aerosol-generating device. In some embodiments, the controller includes one or more computing devices having memory, processing, and communication hardware. The functions of the controller may be performed by hardware and/or as computer instructions on a non-transient computer readable storage medium.

The processor of the controller may include any one or more of a microprocessor, a controller, a microcontroller, a digital signal processor (DSP), an application specific integrated circuit (ASIC), a field-programmable gate array (FPGA), and/or equivalent discrete or integrated logic circuitry. In some examples, the processor may include multiple components, such as any combination of one or more microprocessors, one or more controllers, one or more DSPs, one or more ASICs, and/or one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system.

In one or more embodiments, the exemplary systems, methods, and interfaces may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. In view of the above, it will be readily apparent that the controller functionality as described herein may be implemented in any manner known to one skilled in the art.

Figure 4:
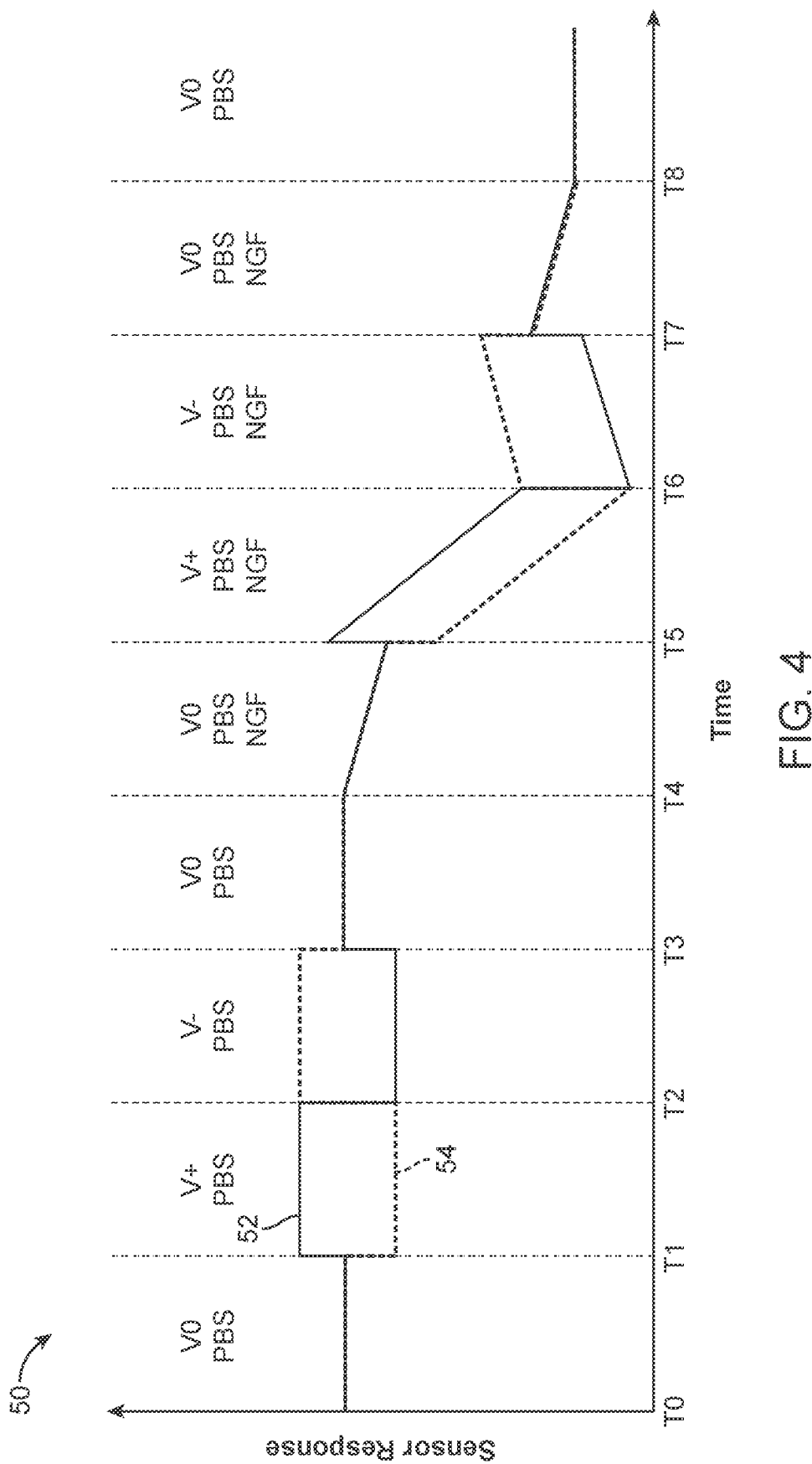
FIG. 4 shows a graph of the expected output of a sensing resonator with various electric fields applied.

FIG. 4 shows a graph 50 of potential expected results of sensing resonator response versus time when flowing a target material in buffer solution through a microfluidic channel and applying various electric fields thereto. A cartridge, such as cartridge 12 (FIG. 3), may be provided. The cartridge may be able to apply an electric field normal to the length of the channel. A plurality of resonators may be provided. At least one of the resonators may be a sensing resonator coated with a binding material, such as a selective antibody, that may bind with particles of a target material, such as nerve growth factor (NGF).

Generally, as used herein, the terms positive and negative refer to relative opposite polarities. As used herein to describe FIG. 4, specifically, a positive electric field refers to a negative charge on the electrode adjacent, or proximate, to the sensing resonator and a positive charge on the electrode on the opposite side of the channel. In other words, positively charged particles in the channel may be encouraged toward the sensing resonator. Accordingly, a negative electric field refers to the opposite charges on the electrodes, which may encourage positively charged particles away from the sensing resonator.

NGF in appropriate buffer conditions has a zeta potential of about +11.4 V at pH 7.4, which was assumed in generating the predicted results in FIG. 4. Under a positive electric field, NGF would be expected to move toward the surface of the sensing resonator, and under a negative electric field, NGF would be expected to move away from the surface of the sensing resonator.

The response of the sensing resonator may be characterized in terms of resonant frequency. The resonant frequency of the sensing resonator may be correlated with the polarity of the electric field or anticorrelated, for example, due to changes in viscosity and particle mass adjacent to the sensing resonator surface. In other words, a positive electric field may offset the output of the sensing resonator in a positive manner if correlated or in negative manner if anticorrelated because of the normal force of the electric field on charged particles that change the viscosity near the surface of the sensing resonator or change the mass of charged particles bound, or merely in contact with, the sensing resonator. The output of a correlated sensing resonator 52 and the output of an anticorrelated sensing resonator 54 are shown.

As shown in the illustrated embodiment, between T0 and T1, while PBS is flowed through the channel, no electric field is applied to the channel. The expected output of the sensing resonator, starting at a baseline magnitude at T0, may be unchanged throughout the period between T0 and T1. The expected output of the sensing resonator may not be offset without an electric field.

Between T1 and T2, while PBS is flowed through the channel, a positive electric field is applied starting at T1. Relative to the baseline magnitude, the expected output of the sensing resonator may be offset in a positive direction if correlated or offset in a negative direction if anticorrelated to the positive electric field starting at T1.

The magnitude of the sensor response offsets may be proportional to the charged particles near or at the surface of the sensing resonator, which may shift the sensor response (for example, resonant frequency) due to a shift in viscosity or mass at the surface of the sensing resonator.

Between T2 and T3, while PBS is flowed through the channel, a negative electric field is applied to the channel starting at T2. Relative to the baseline magnitude, the expected output of the sensing resonator may be offset in a negative direction if correlated or offset in a positive direction if anticorrelated starting at T2.

Between T3 and T4, while PBS is flowed through the channel, no electric field is applied to the channel once again. The expected output of the sensing resonator may return to the baseline magnitude. The expected output of the sensing resonator may no longer be offset.

Between T4 and T5, PBS containing an amount of NGF is flowed through the channel, and no electric field is applied to the channel. The NGF in the PBS may have a positive zeta potential. The expected output of the sensing resonator may not be offset without an electric field. The NGF target material may bind to the binding material on the sensing resonator at a nominal binding rate. Relative to the baseline magnitude, the expected output of the sensing resonator may begin to decrease in response to the binding. The decrease may be described as a nominal binding slope corresponding to the nominal binding rate. The nominal binding slope may describe the concentration of a fraction of the target material in the channel that passes near the surface of the sensing resonator.

As illustrated, the slopes described herein are linear. In some embodiments, the slopes may be non-linear.

Between T5 and T6, PBS and NGF are flowed through the channel, and a positive electric field is applied to the channel starting at T5. The expected output of the sensing resonator may be offset in a positive direction if correlated or offset in a negative direction if anticorrelated starting at T5. The NGF target material may bind to the binding material on the sensing resonator at an enhanced binding rate greater than the nominal binding rate. The decrease of the expected output of the sensing resonator in response to the binding may be described as an enhanced binding slope corresponding to the enhanced binding rate. The enhanced binding slope may describe a concentrated fraction of target material in the channel near the surface of the sensing resonator due to the presence of the electric field.

Between T6 and T7, PBS and NGF are flowed through the channel, and a negative electric field is applied to the channel starting at T6. The expected output of the sensing resonator may be offset in a negative direction if correlated or offset in a positive direction if anticorrelated starting at T6. Any non-target material having the same charge as the target material (for example, positively charged particles) may be encouraged away from the surface of the sensing resonator. In addition, any target material that has not specifically bound with the binding material, such as an antibody, that is present on the surface of the resonator due electrostatic forces may be encouraged away from the surface of the sensing resonator. The expected output of the sensing resonator may increase. The increase may be described as a removing slope. The removing slope may describe the removal of non-target material mass from the surface of the sensing resonator while the NGF target material, already bound to the binding material on the sensing resonator, remains bound.

Between T7 and T8, PBS and NGF are flowed through the channel, and no electric field is applied to the channel starting at T7. The expected output of the sensing resonator may not be offset without an electric field. The NGF target material may bind to the binding material at the nominal binding rate. The expected output of the sensing resonator may decrease (due to increased mass being added to the surface as NGF binds) according to the nominal binding slope.

Starting at and beyond at T8, PBS is flowed through the channel, and no electric field is applied to the channel starting at T8. The expected output of the sensing resonator may not be offset without an electric field. After flowing potential target material through the channel, the introduction of PBS without any target material, non-target material, or both may be described as a washing step.

While the present disclosure is not so limited, an appreciation of various aspects of the disclosure will be gained through a discussion of the specific examples and illustrative embodiments provided below, which provide alloys with superior mechanical and corrosion properties. Various modifications of the examples and illustrative embodiments, as well as additional embodiments of the disclosure, will become apparent herein.

Example 1

In one example, the effect of electric field polarity on the frequency shift of a sensing resonator was demonstrated using stagnant solution. Two resonators were provided (manufactured by Qorvo, Bend, Oreg.) in a sensor having a microfluidic channel. The microfluidic channel had a cross-section orthogonal to the direction of fluid flow with a 45 µm height and a 500 µm width. A binding material including an antibody for aNGF (manufactured by Sino Biologicals, Beijing, P.R. China) was provided on a first resonator (sensing resonator), and a non-binding material including an antibody for thyrotropin-releasing hormone (aTSH) (manufactured by R&D Systems, Minneapolis, Minn.) was provided on a second resonator (reference resonator). A buffer solution of PBS (manufactured by Sigma-Aldrich, St. Louis, Mo.) was provided having an ionic strength of 175 mM. The aTSH was selected as a reference antibody, which may bind with a particle of similar size to NGF but not NGF itself, except for non-specific binding (no actual covalent bond formed).

The isoelectric point (zeta potential equal to zero) of an NGF particle (manufactured by Sino Biologicals, Beijing, P.R. China) was determined to correspond to a pH 10.1. At pH 7.4, the zeta potential of the NGF particle was determined to be +11.4 V. The isoelectric point of a bovine serum albumin (BSA) particle (manufactured by Sigma-Aldrich, St. Louis, Mo.) was determined to correspond to pH 5.7. The pH was measured using a pH meter and probe. At pH 7.4, the zeta potential of the BSA particle was determined to be −28.4. The BSA particle was selected to not bind with the aNGF or the aTSH as a control.

Two electrodes were provided on opposites of the channel and electrically isolated from the contents of the channel. One electrode was adjacent, or proximate, to the resonators and the other electrode was provided on the opposite side of the channel (for example, a top side). The electrodes covered the entire length of the channel, except for end portions described as an upstream port and a downstream port. An electric field was selectively provided using the electrodes at a potential difference of 0 mV, +100 mV, and −100 mV in a sequential manner over time. The frequency shift of the difference between the outputs of the sensing and reference resonators over time were measured using a vector network analyzer when subjected to the various electric fields.

Figure 5:
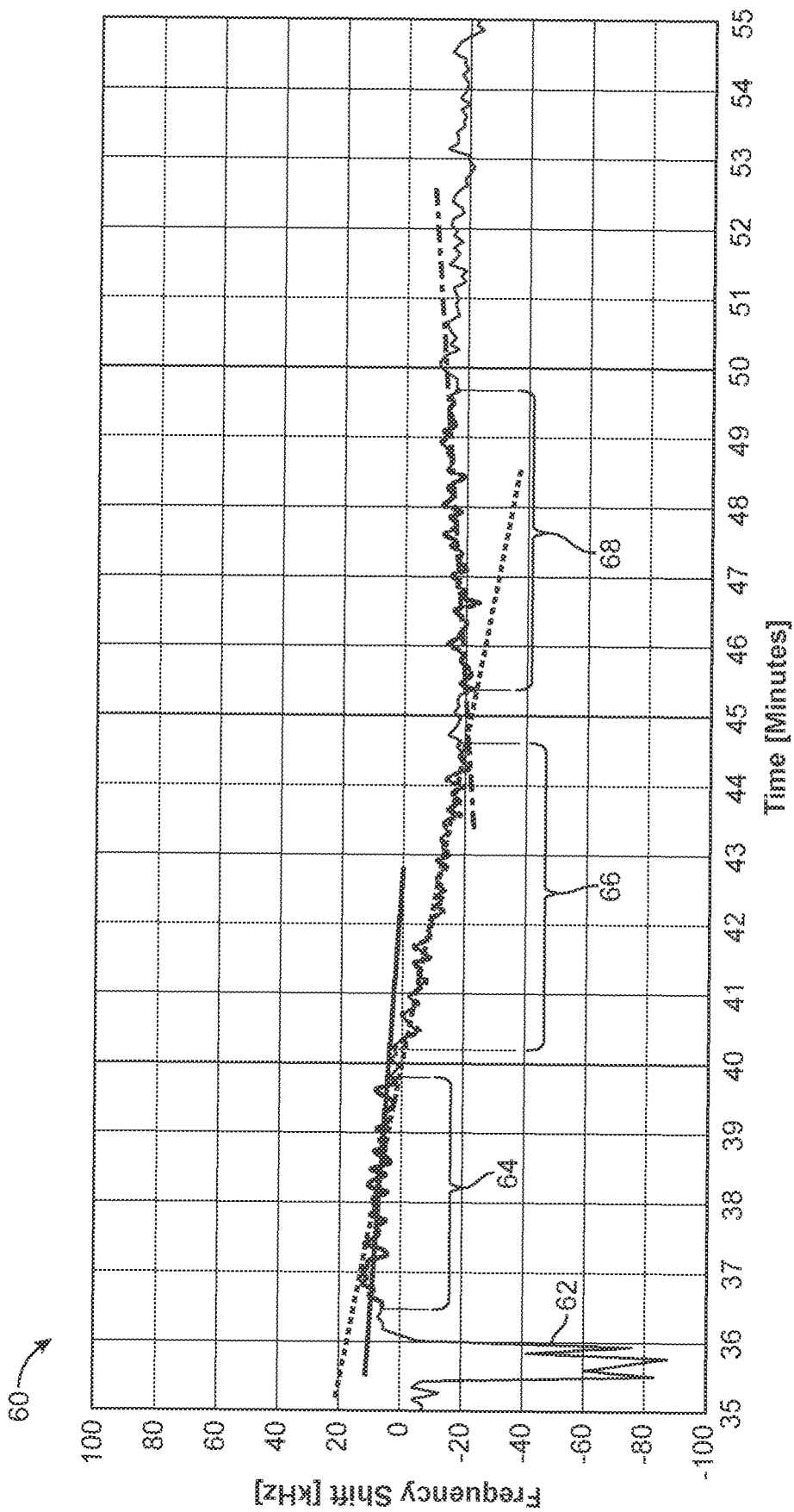
FIG. 5 shows a graph of the frequency shift of a difference between a sensing resonator and a reference resonator over time.

FIG. 5 shows a graph 60 of the frequency shift 62 of the difference between the sensing (aNGF) and reference (aTSH) resonators over time. The difference between sensing and reference resonators may help to remove a frequency shift due to non-specific binding, such as BSA or other material non-covalently bonded to or in contact with, the sensing resonator. The sensor was equilibrated in temperature for about 36.5 minutes following the pattern shown in FIG. 4 from T0 to T3. During the period 64, between about 36.5 minutes and about 39.8 minutes, a solution was added to the microfluidic channel having NGF at a concentration of 1 ng/mL of total PBS and BSA at a concentration of 1% of total PBS (10 mg/mL). The solution was not actively flowed through the channel during measurement, so the velocity of the solution in the channel was assumed to be about zero. During the period 64, no electric field was applied to the channel (0 mV potential). The frequency shift 62 determined during period 64 was fitted to a line having a slope of about −1.57 kHz/minute using a least squares method.

During the period 66, between about 40.2 minutes and about 44.6 minutes, a positive electric field was applied to the channel (+100 mV potential). The electrode closer to the sensing resonator was provided with a negative charge relative to the electrode on the opposite side of the channel. The frequency shift 62 determined during period 66 was fitted to a line having a slope of about −4.3 kHz/minute.

During period 68, between about 45.4 minutes and about 49.8 minutes, a negative electric field was applied to the channel (−100 mV potential). The electrode closer to the sensing resonator was provided with a negative charge relative to the electrode on the opposite side of the channel. The frequency shift 62 determined during the period 68 was fitted to a line having a slope of about 1.53 kHz/minute.

This example demonstrated, at least, that the application of a positive electric field to the channel containing a target material suspended in fluid showed a greater frequency shift over time compared to the absence of an electric field. On the other hand, a negative electric field applied to the channel showed a frequency shift over time opposite to the frequency shift over time in the absence of an electric field.

Example 2

In another example, the effect of various electric fields magnitudes on the concentration at the surface of the sensing resonator was demonstrated using a solution flowed through a microfluidic channel. Using the materials described in Example 1, except as described differently herein, two resonators were provided in a sensor having a microfluidic channel. A binding material including an antibody for NGF was provided on a first resonator (sensing resonator), and a non-binding material including an antibody for TSH was provided on a second resonator (reference resonator). A buffer solution of PBS was provided having an ionic strength of 175 mM.

Two electrodes were provided on opposites of the channel and electrically isolated from the contents of the channel. One electrode was adjacent, or proximate, to the resonators and the other electrode was provided on the opposite side of the channel (for example, a top side). An electric field was selectively provided using the electrodes at a potential difference of 0 mV, +100 mV, and +500 mV in a sequential manner over time. The frequency shift of the difference between the outputs of the sensing and reference resonators over time were measured using a vector network analyzer when subjected to the various electric fields.

Figure 6:
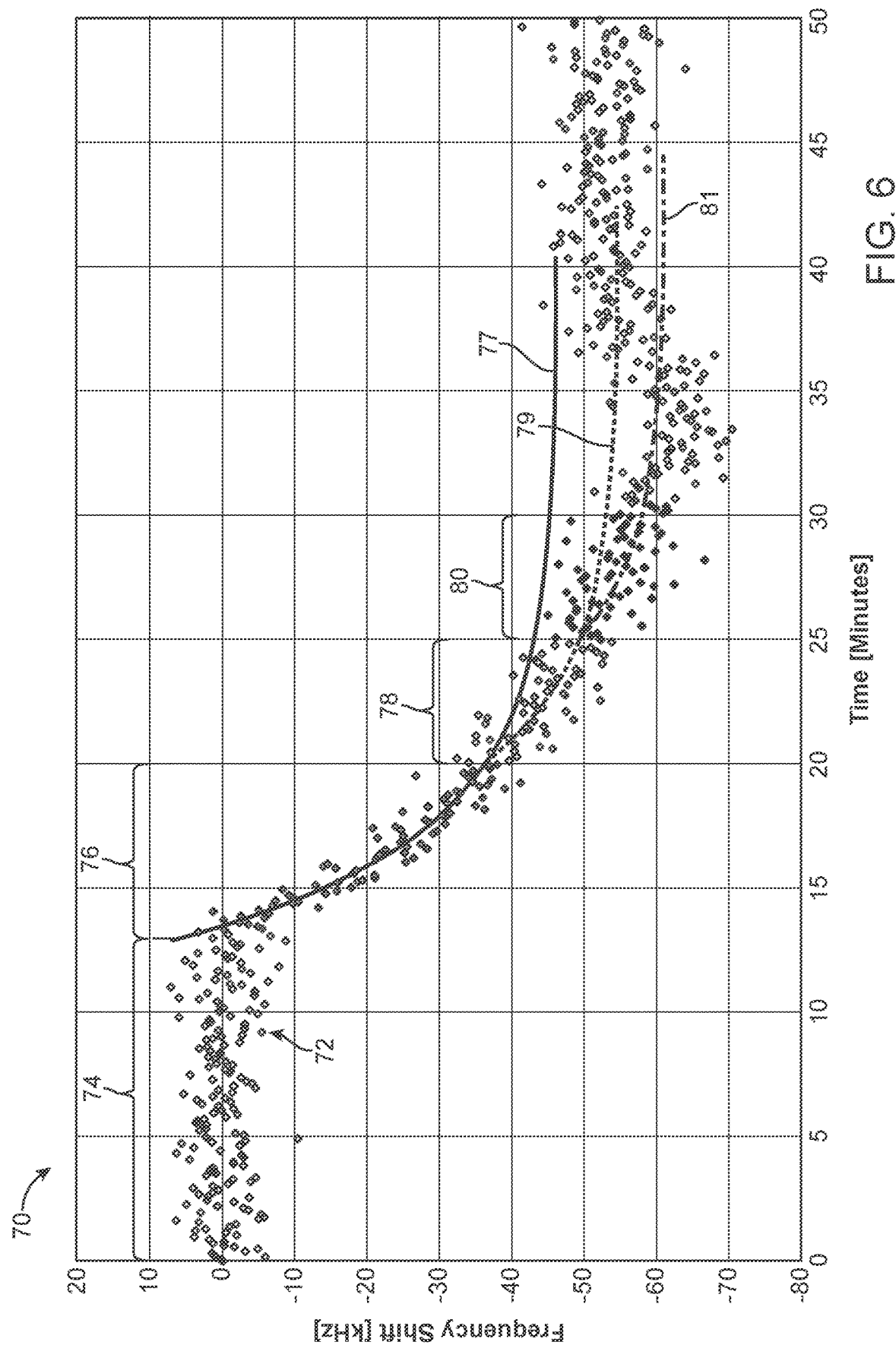
FIG. 6 shows a graph of measurements of the frequency shift of a difference between a sensing resonator and a reference resonator over time.

FIG. 6 shows a graph 70 of point measurements taken of the frequency shift 72 of the difference between the sensing and reference resonators over time. During period 74, between about 0 minutes and about 13.5 minutes, a solution including BSA at a concentration of 1% of total PBS (10 mg/mL) was introduced to the channel at 50 µL/minute. At about the 10 minute mark during period 74, NGF at a concentration of about 250 pg/mL of PBS was added to the solution.

During period 76, between about 13.5 minutes and about 20 minutes, still no electric field was applied but a change in the slope of the frequency shift 72 was determined to begin at about 13.5 minutes. The data points of the frequency shift 72 determined during period 76 were fitted to a line 77 according to a physical model described by EQ. 4 (below). The concentration of target material (NGF) according to this line fit was determined to be about 250 pg/mL.

$$f(t) - f(0) = F_{max}\left(\frac{k_{on} * C}{k_{on} * C + k_{off}}\right)\left(1 - e^{-(k_{on}*C+k_{off})*t}\right) \quad \text{EQ. 4}$$

where t is the time elapsed from initial time t=0 at the start of the experiment, f(t) is the frequency of the resonator at time t, f(0) is the frequency of the resonator at t=0, $F_{max}$ is the maximum frequency shift capable of the resonator based on a packed sphere model for antibodies (assuming both binding sites are available and populated with target material), $k_{on}$ is the rate of reaction for antigen(aq)+antibody(s) →antigen-antibody(s) (for example, antigen is a target material and antibody is the binding material), $k_{off}$ is the rate of reaction for antigen-antibody(s)→antigen(aq)+antibody(s), and C is the concentration of the antigen just above the surface of the resonator.

During period 78, between about 20 minutes and about 25 minutes, a positive electric field was applied to the channel (+100 mV potential). The data points of the frequency shift 72 determined during period 78 were fitted to a line 79 according to the physical model. The concentration of target material (NGF) according to this line fit was determined to be about 490 pg/mL, or about 2 times the concentration determined during period 76 without the electric field.

During period 80, between about 25 minutes and about 31 minutes, a greater positive electric field was applied to the channel (+500 mV potential). The data points of the frequency shift 72 determined during period 78 were fitted to a line 81 according to the physical model. The concentration of target material (NGF) according to this line fit was determined to be about 1100 pg/mL, or about 4.4 times the concentration determined during period 76 without the electric field.

This example demonstrated, at least, that the magnitude of the electric field increased the concentration of target material at the surface of the sensing resonator. In particular, the concentration of target material on the surface of the sensing resonator was increased proportional to the magnitude of the electric field applied to the channel. The greater the magnitude of the electric field (for example, potential applied to the electrodes), the greater concentration was measured at the surface of the sensing resonator.

Example 3

In yet another example, the effect of different types of electric fields on the frequency shift of different resonators was demonstrated using a solution flowed through a microfluidic channel. Using the materials described in Example 1, except as described differently herein, two resonators were provided in a sensor having a microfluidic channel. A binding material including an antibody for NGF was provided on a first resonator (sensing resonator), and a non-binding material including an antibody for TSH was provided on a second resonator (reference resonator). A buffer solution of PBS was provided having an ionic strength of 175 mM.

Two electrodes were provided on opposites of the channel and electrically isolated from the contents of the channel. One electrode was adjacent, or proximate, to the resonators and the other electrode was provided on the opposite side of the channel (for example, a top side). An electric field was selectively provided using the electrodes at a potential difference of about 0 V, about 2.5 V, and about −0.25 V in a sequential manner over time. The frequency shift of the difference between the outputs of the sensing and reference resonators over time were measured using a vector network analyzer when subjected to the various electric fields.

Figure 7:
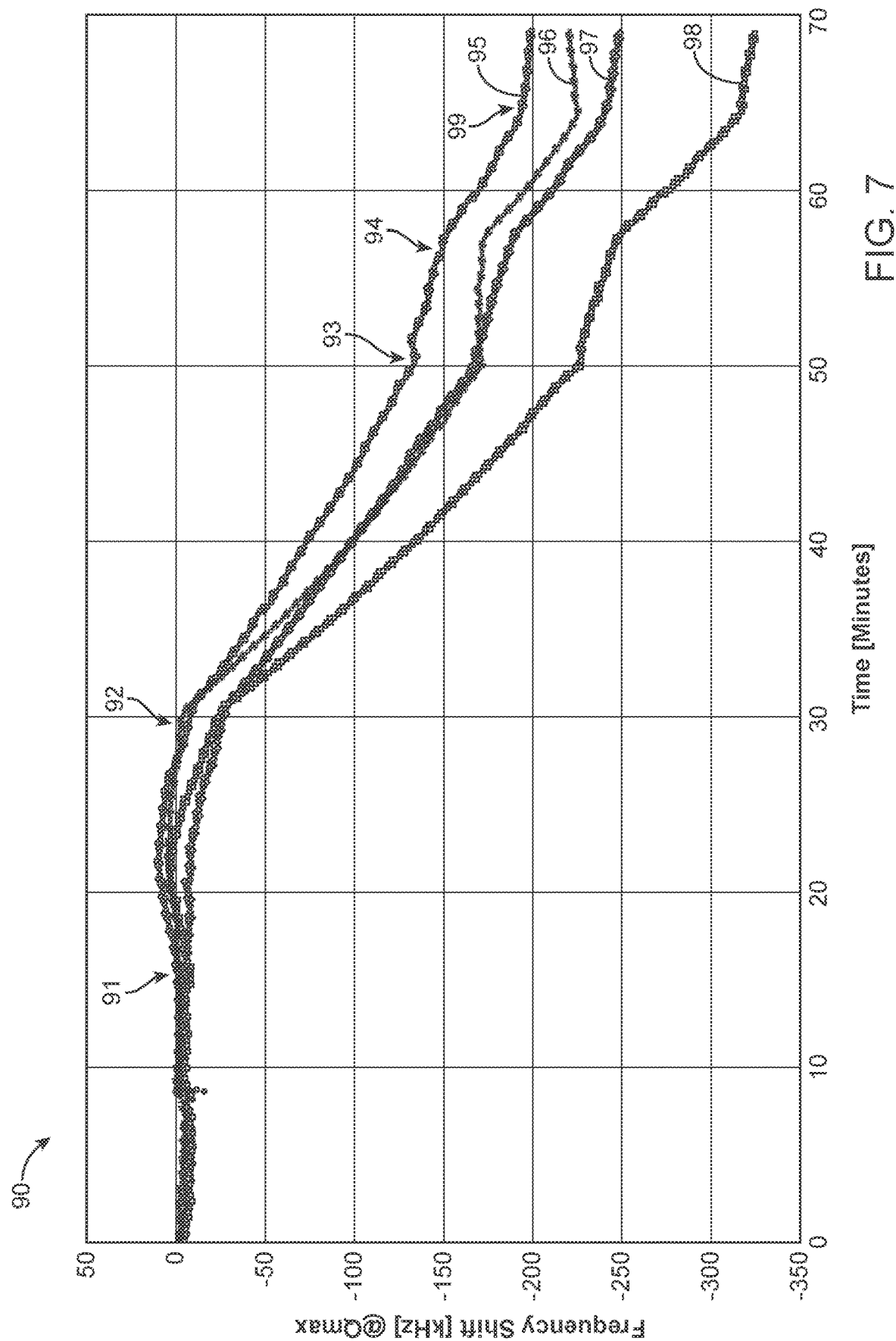
FIG. 7 shows graph of baseline corrected measurements of frequency shift of various resonators over time as various types of electric fields are applied to a channel with a baseline correction.
Figure 8:
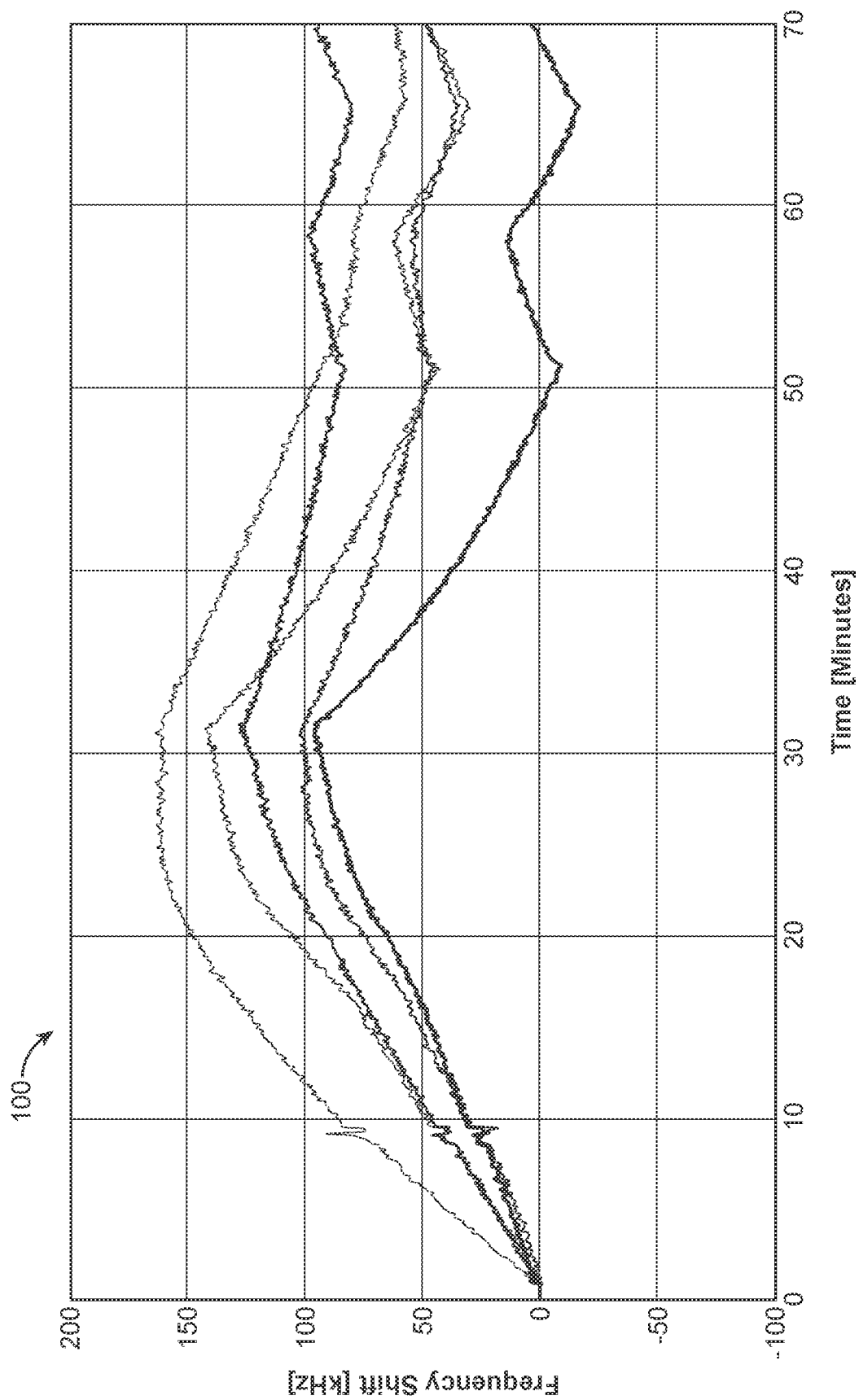
FIG. 8 shows the graph of raw measurements of the graph of FIG. 7 without baseline correction.

FIG. 7 shows a graph 90 of the frequency shift of various resonators over time 95, 96, 97, 98 as various types of electric fields are applied to the channel with a baseline correction. FIG. 8 shows the graph 100 of the raw data of graph 90 without baseline correction. Between about t=0 minutes and about t=10 minutes the flow of PBS with 1% of BSA (10 mg/mL), and temperature, controlled to about 37° C., were equilibrated. At about t=10 minutes the sample (250 pg/ml of NGF in 1×PBS with 1% of BSA (10 mg/mL)) from a sample loop, or feed, was injected into the stream and arrived at the sensor at time 91, at about t=13 minutes. Binding of the NGF to the sensors was observed during this period. At time 92, at about t=30 minutes, a positive 2.5 VDC was applied to the electrodes. An increase in reaction rate was observed during this period. At time 93, at about t=50 minutes, a square wave signal with amplitude of about +2.5 V with a 50% duty cycle and −0.25 V 50% duty cycle was applied. The reaction rate decreased relative to the previous period. Starting at time 94, at about t=57 minutes, through t=65 minutes, the square wave duty cycle was adjusted to 90% at about +2.5 V amplitude and 10% at about −0.25V amplitude. The rate again increased relative to the rate during the previous period. At about t=60 minutes, the sample loop was switched off, and the sample depleted at time 99, at about t=65 minutes. This period showed a markedly reduced reaction rate relative to that of prior periods in which the sample was present.

Thus, various embodiments of MICROFLUIDIC SENSORS USING ELECTROPHORESIS are disclosed.

Although reference is made herein to the accompanying set of drawings that form part of this disclosure, one of at least ordinary skill in the art will appreciate that various adaptations and modifications of the embodiments described herein are within, or do not depart from, the scope and spirit of this disclosure. For example, aspects of the embodiments described herein may be combined in a variety of ways with each other. Therefore, it is to be understood that, within the scope of the appended claims, the claimed invention may be practiced other than as explicitly described herein.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (for example 1 to 5 includes 1, 1.5, 2, 2.75, 3, 3.80, 4, and 5) and any range within that range. Herein, the terms "up to" or "no greater than" a number (for example, up to 50) includes the number (for example, 50), and the term "no less than" a number (for example, no less than 5) includes the number (for example, 5).

Unless otherwise noted, all parts, percentages, ratios, etc. of material are by weight per volume.

The terms "coupled" or "connected" refer to elements being attached to each other either directly (in direct contact with each other) or indirectly (having one or more elements between and attaching the two elements).

Terms related to orientation, such as "top," "bottom," "center," "edge," "left," "right," "side," "end," "proximal," and "distal," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open ended sense, and generally mean "including, but not limited to". It will be understood that "consisting essentially of" "consisting of," and the like are subsumed in "comprising," and the like.

The phrases "at least one of," "comprises at least one of," and "one or more of" followed by a list refers to any one of the items in the list and any combination of two or more items in the list.

What is claimed is:

1. An apparatus comprising:
    first and second electrodes configured to provide an electric field therebetween when operatively coupled to a power source;
    first and second dielectric layers disposed between the first and second electrodes, the dielectric layers spaced from one another to at least partially define a microfluidic channel therebetween, the microfluidic channel extending along a length normal to the electric field; and
    a bulk acoustic wave (BAW) resonator comprising a piezoelectric portion disposed between the first electrode and a driving electrode, the driving electrode disposed outside of the channel, the first electrode and the driving electrode operatively coupled to an oscillation circuit to power the resonator,
    wherein the first and second electrodes are operatively coupled to a controller configured to apply a potential to the electrodes to generate the electric field, and
    wherein the controller is configured to determine a concentration, a mass, or both.

2. An apparatus comprising:
    first and second electrodes configured to provide an electric field therebetween when operatively coupled to a power source;
    first and second dielectric layers disposed between the first and second electrodes, the dielectric layers spaced from one another to at least partially define a microfluidic channel therebetween, the microfluidic channel extending along a length normal to the electric field; and
    a bulk acoustic wave (BAW) resonator comprising a piezoelectric portion disposed between the first electrode and a driving electrode, the driving electrode disposed outside of the channel, the first electrode and the driving electrode operatively coupled to an oscillation circuit to power the resonator,
    wherein the first dielectric layer comprises a binding material to bind to a target material.

3. A method comprising:
    applying a potential to first and second electrodes to generate an electric field normal to a length of a microfluidic channel disposed adjacent to a bulk acoustic wave (BAW) resonator;
    flowing a fluid through the microfluidic channel over the resonator; and
    determining an amount of a target material in the fluid based on a characteristic of the resonator.

4. The method of claim 3, further comprising varying the potential to pulse the electric field.

5. The method according to claim 3, further comprising reversing the potential to reverse the electric field before determining the amount of the target material.

6. The method according to claim 3, further comprising flowing a washing fluid over the resonator before determining the amount of the target material.

7. The method according to claim 3, wherein the target material is a biomolecule having a non-zero zeta potential.

8. The method according to claim 3, further comprising adjusting a pH of the fluid before, after, or before and after determining the amount of the target material.

9. The method according to claim 3, wherein the amount of the target material determined comprises at least one of a concentration, a mass, or both.

10. The method according to claim 3, wherein the fluid comprises a buffer solution or complex matrix.

11. The method according to claim 3, wherein the electric field is generated along about 50% to about 100% of the length of the microfluidic channel, and wherein the microfluidic channel is disposed in a microfluidic cartridge.

* * * * *